July 23, 1957 A. HAZELTINE 2,800,608

AUTOTRANSFORMER FOR SCANNING SYSTEM OF TELEVISION RECEIVER

Filed March 8, 1952

INVENTOR.
ALAN HAZELTINE

BY Laurence B. Dodds

ATTORNEY 2,800,608
Patented July 23, 1957

2,800,608

AUTOTRANSFORMER FOR SCANNING SYSTEM OF TELEVISION RECEIVER

Alan Hazeltine, Maplewood, N. J., assignor to Hazeltine Research, Inc., Chicago, Ill., a corporation of Illinois Application March 8, 1952, Serial No. 275,603
14 Claims. (Cl. 315—27)

*General*

Figure 1:
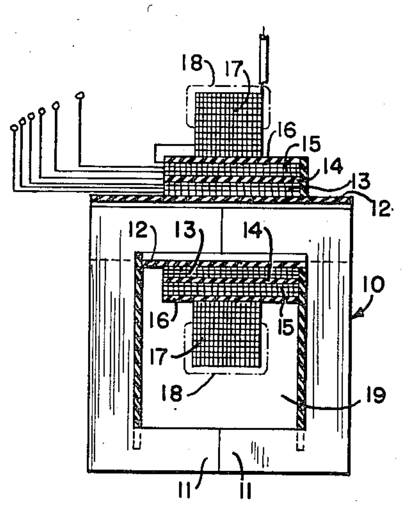

The present invention relates to autotransformers for use in the scanning systems of television receivers. Such transformers have particular utility in the line-scanning and high-voltage power-supply system of a television receiver employing magnetic deflection of the electron beam of the cathode-ray image-reproducing tube thereof. Accordingly, the invention will be described in that environment.

In a television receiver which utilizes magnetic deflection of the cathode-ray beam of the image-reproducing tube, it is customary to pass through the inductor comprising the line-scanning winding a current of saw-tooth wave form having relatively long trace intervals and relatively short retrace intervals. A generator which develops a periodic voltage applies the latter to the input circuit of an amplifier that is capable of delivering relatively large amounts of energy to a load circuit which includes an output transformer and also the line-scanning winding of the cathode-ray tube. The foregoing generator is usually referred to in the television art as a "driver stage" for the amplifier, the latter ordinarily being designated as the line-scanning amplifier. The amplifier customarily employs a screen-grid type of tube such as a tetrode because of its high mu, its low control electrode-anode capacitance, and its large power-handling capability.

A rectifier device comprising a so-called "damper" diode cooperating with the output transformer supplies a portion of the saw-tooth current to the line-scanning winding and develops a unidirectional voltage higher than that of the power source for the anode supply of the tetrode and commonly for other uses. The screen-electrode voltage of the tetrode is usually supplied directly from the power source. One or more high-voltage diodes are coupled to a step-up winding of the transformer to supply a rectified high voltage to the second anode of the cathode-ray tube.

Autotransformers are being rather widely employed in television receivers as output transformers of the type under consideration. A conventional type autotransformer employed for the purposes mentioned above is costly to manufacture for reasons to be stated hereinafter. Such a transformer relies on large clearances in the air between the high-voltage portion of its winding and its core to prevent dielectric breakdown or corona in the air. Only a thin covering of solid insulation over the outer surface of the high-voltage portion is employed as a further protection against corona where the dielectric field is concentrated, such as at the edges or rough spots on the outer surface. These large clearances result in a large window or opening in the core through which the coil passes. This, in turn, entails a long magnetic circuit which requires the correspondingly large number of turns in the winding to maintain the exciting current at a suitably low value. Furthermore, the large number of turns requires a relatively coarse wire in those portions of the winding which carry considerable currents in order to reduce resistance losses and the consequent heating. The large number of turns and the coarse wire conspire further to increase the size of the transformer, the effect thus being cumulative.

Furthermore, in the conventional output transformer, the two portions of the winding, one with coarse wire and the other with fine wire, must be wound in at least two operations on two winding machines with different gear ratios. In present practice, the coarse-wire portion is also broken for insertion of a linearity-correcting network so that three winding operations are actually required, with the insertion of a sheet of cloth insulation between each two consecutive winding portions.

It is an object of the invention, therefore, to provide a new and improved autotransformer for the scanning system of a television receiver which avoids one or more of the above-mentioned disadvantages of prior such transformers.

It is another object of the invention to provide a new and improved autotransformer for the scanning system of a television receiver which is simple in construction, easy to fabricate and assemble, and relatively inexpensive to manufacture.

It is a further object of the invention to provide a new and improved autotransformer for the scanning system of a television receiver which is small in size and yet has a reduced tendency for corona to occur therein.

In accordance with a particular form of the invention, an autotransformer for the line-scanning system of a television receiver comprises a core of magnetic material shaped to form a closed magnetic path, and a single continuous multiple-layer multipurpose winding of insulated wire of uniform gauge surrounding a portion of the core and having a rectangular axial plane cross section and having a plurality of intermediate electrical connections defining a plurality of winding portions. One of the aforesaid portions is adapted to be connected to the line-scanning winding of the cathode-ray tube of the receiver for supplying a scanning wave thereto and the entire winding is adapted to be connected through a rectifier between the anode and the cathode of that tube for supplying high voltage therebetween. The autotransformer also includes a body of solid insulating material completely surrounding the winding to a depth of the order of the smaller dimension of the rectangular cross section and substantially occupying all the space between the winding and the core for preventing corona between the surfaces of the winding and the core.

For a better understanding of the present invention, together with other and further objects thereof, reference is had to the following description taken in connection with the accompanying drawing, and its scope will be pointed out in the appended claims.

Figure 2:
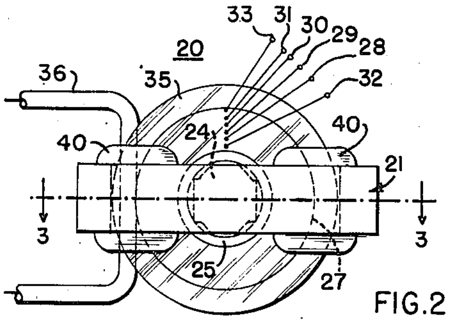
Figure 3:
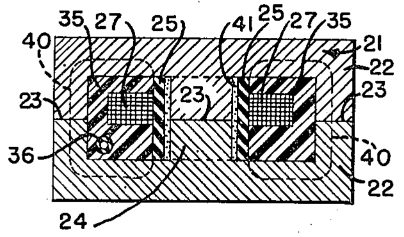
Figure 6:
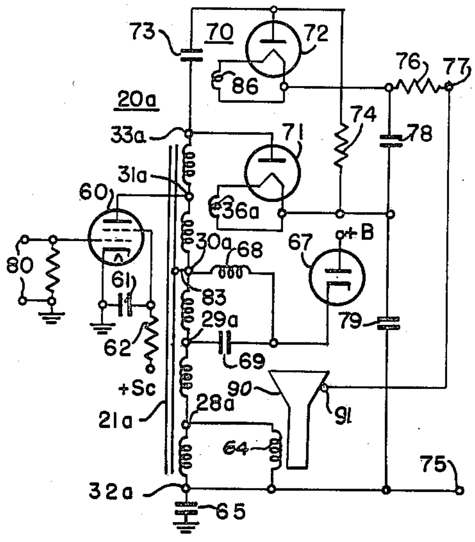
Figure 4:
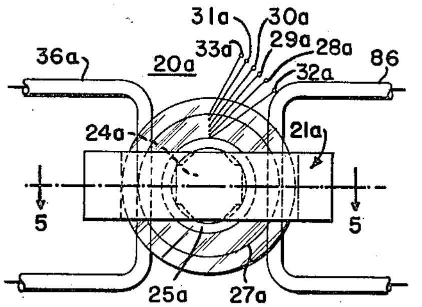
Figure 5:
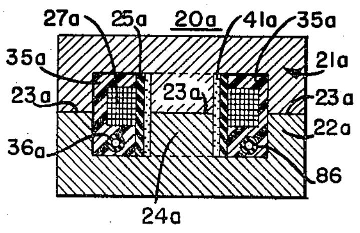

Referring now to the drawing, Fig. 1 is an elevational view, with portions in section, of a conventional autotransformer for the line-scanning system of a television receiver; Fig. 2 is a plan view of an autotransformer, in accordance with a particular form of the present invention, for use in the line-scanning system of such a receiver; Fig. 3 is a sectional view on the line 3—3 of Fig. 2; Fig. 4 is a plan view of a modified form of an autotransformer in accordance with the invention; Fig. 5 is a sectional view on the line 5—5 of Fig. 4; and Fig. 6 is a circuit diagram of a generating system employing an autotransformer in accordance with the Figs. 4 and 5 embodiment of the invention.

*Description of conventional transformer of Fig. 1*

Referring now to Fig. 1 of the drawing, the conventional transformer there represented includes a core 10 of magnetic material comprising a pair of abutting C-shaped members 11, 11 having a square cross section in a plane normal to the plane of the drawing. An insulating coil form 12 of circular cross section is disposed about one leg of the core 10 and supports a multilayer secondary winding 13 of relatively large gauge insulated wire. A suitable circumferential insulating spacer 14 is superimposed on the winding 13 and a multilayer winding 15 also of relatively large gauge insulated wire is disposed on the spacer. The windings 13 and 15 are adapted to carry relatively large currents and are separated for connection to a linearity-correcting network, mentioned previously. An insulating spacer 16 is preferably disposed around the circumference of the winding 15 and a multilayer high-voltage step-up winding 17, having a small axial dimension or thickness and a large outer diameter relative to the corresponding dimensions of the windings 13 and 15 is supported by the spacer 16. The winding 17 is constructed of many turns of insulated wire of smaller gauge than that of the windings 13 and 15, and a suitable thin insulating jacket 18 encloses most of the winding 17. The various windings just described include suitable terminals or electrical connections for connecting the transformer to the various circuits of a television line-scanning system.

The windings 13 and 15 have axial dimensions which are large relative to their cross-sectional dimensions normal to the axis thereof for the purpose of reducing the over-all diameter of the windings and the height of the window or opening 19 in the transformer core 10. In spite of the described expedient to reduce the over-all diameter of the windings 13 and 15, the window 19 is large since relatively large spacings between the high-voltage winding 17 and the inner surfaces of the core members 11, 11 must be maintained in order to prevent corona. These large spacings cause the core 10 to have a long magnetic path, thus requiring a relatively large number of turns in the windings to prevent excessive exciting current; and the large numbers of turns in the windings 13 and 15 require the use of large gauge wire to prevent excessive resistance losses. The large numbers of turns and the large gauge wire further increase the required window size.

As previously mentioned, three distinct winding operations are required in constructing the various windings of the typical transformer just described, thus considerably increasing the manufacturing cost of the transformer.

*Description of transformer of Figs. 2 and 3*

Referring now more particularly to Figs. 2 and 3 of the drawing, there is represented to the same scale as in Fig. 1 an autotransformer 20, constructed in accordance with the invention, for the line-scanning system of a television receiver, for use under the same conditions as the transformer of Fig. 1. The transformer comprises a core 21 of magnetic material shaped to form a pair of closed magnetic paths. The core 21 may be of a suitable high-permeability and high-resistivity material such as a ferrite, for example, that sold under the trade name "Ferroxcube 3C." A ferrite of this type is a homogeneous compound of iron oxide with the metal oxides of manganese and zinc and has a cubic crystalline structure. Such a ferrite contains oxides of the elements nickel, zinc, and iron in the proportions of substantially 25/25/50. In particular, the core 21 includes a pair of E-shaped portions 22, 22 (see Fig. 3) having three pairs of free ends 23, 23 in abutting relationship and including an inner core leg 24 which is common to both of the magnetic paths. The use of E-shaped cores, rather than the C-shaped cores of Fig. 1, shortens the magnetic circuit and provides more heat radiating surface. The core leg 24 preferably has a circular or an approximately circular cross section (see Fig. 2) and, hence, may have a nearly regular octagonal periphery.

A cylindrical coil form 25 of suitable insulating material such as that sold under the trade name "Bakelite" is disposed about the inner leg 24 of the core in a relatively close fitting relationship. A continuous multiple layer multipurpose winding 27 of insulated wire of uniform gauge is superimposed on the coil form 25 and has an axial plane cross section of rectangular or a similar continuous regular configuration. The winding 27 is made of small diameter wire similar to that employed in the high-voltage winding 17 represented in Fig. 1. The winding 27, therefore, can be manufactured quickly and economically in a single winding operation on a universal winding machine. The axial dimension or thickness of the winding 27 is small relative to the outer diameter of the winding, for example, one-fifth thereof. Although the winding contains a relatively large number of turns to produce the necessary voltages, its diameter is quite small because of the gauge of the wire which is employed. As represented in Fig. 2, the winding 27 has a suitable plurality of electrical connections or terminals 28–31, inclusive, intermediate its end terminals 32, 33, and these terminals are effective to define a plurality of winding portions for connection to various circuits of the line-scanning system of a television receiver. The winding 27 does not occupy the entire opening in the core 21 and is oriented intermediate the ends of the core leg 24 as shown in Fig. 3 so that it may be suitably insulated from the inner surfaces of the core 21.

The autotransformer further includes a body 35 of solid insulating material such as wax or polystyrene completely surrounding the winding 27 to a depth of the order of the smaller dimension of the cross section thereof, namely, within the range of one-third to one times the thickness of the winding, and the body substantially occupies the space or window between the winding and the core for preventing corona between the surfaces of the two last-mentioned members and for carrying heat away from the winding. The peripheral portions of the insulating body 35 adjacent the E-shaped portions 22, 22 of the core include extensions 40, 40 which lengthen the dielectric path between the outer periphery of the winding 27 and the core 21. For some applications, such as when the body 35 consists of polystyrene, it is preferable to fill any clearance spaces or voids between the body 35 or the coil form 25 and the core 21 with a viscous insulating material 41 (see Fig. 3), such as an organo-silicon compound frequently referred to as a silicone, further to prevent corona. This viscous material is particularly useful in the clearance spaces between the core leg 24 and the winding 27 or its coil form 25, and is also useful near any sharp edges where corona has a tendency to occur. Certain portions such as alternate portions of the winding 27 carry very little current which does not heat them appreciably. These portions, being in intimate thermal contact with the intermediate heated portions, serve effectively to conduct heat from the latter.

An insulated wire loop 36 is supported in the body 35 of insulating material and is looped about one outer leg of the core. This loop links but one-half of the magnetic flux of the transformer and, therefore, effectively constitutes a one-half turn which is adapted to supply filament current to a single high-voltage rectifier device associated with the line-scanning system of a television receiver.

The general operation of an autotransformer is well understood in the electrical art and need not be explained herein. The insulating body 35 of the transformer 20, because of its good electrical insulating properties, permits smaller clearances to be maintained between the winding 27 and the surface of the core 21 than could be safely tolerated if air constituted the electrical insulating medium between the outer surfaces of the winding and the core. Since smaller clearances are possible, the over-all length of the magnetic core may be reduced thereby effecting a saving in core material.

The thickness of the continuous multiple layer winding 27 in the autotransformer of the present invention is smaller than the multisection winding employed in a conventional output transformer for the line-scanning system of a television system. This, in turn, enables the use of a core leg 24 having a correspondingly smaller length thereby effecting an additional saving in core material. The small axial length of the core leg 24 permits the cross section thereof to be reduced without excessive total core loss or exciting current. This smaller core cross section allows the winding 27 to have a smaller inner as well as a mean radius which, in turn, lowers the resistance, capacitance and the leakage reactance of the transformer. When the cross section of the core leg 24 is either circular or approximates a circle, the inner radius of the winding 27 is minimized, thus further lowering its resistance, capacitance and leakage reactance; and the final effect is such as to permit the use of a smaller gauge wire for the winding 27 with less wire insulation which, in turn, reduces the dimensions of the rectangular cross section of the winding. An autotransformer constructed in accordance with the present invention is smaller and considerably less expensive than a transformer heretofore widely employed in the line-scanning system of a television receiver.

*Description of transformer of Figs. 4 and 5*

Figs. 4 and 5 are plan and sectional views, respectively, of a modified form of an autotransformer in accordance with the present invention which is essentially similar to the transformer represented in Figs. 2 and 3. Accordingly, similar circuit elements are designated by the same reference numerals and analogous elements by the same reference numerals with the subscript "*a*." The autotransformer **20*a* of Figs. 4 and 5 is intended for use with a voltage-doubler type of high-voltage rectifier system and, accordingly, employs an additional wire loop 86 similar to the loop 36*a* for supplying filament current to the second high-voltage rectifier device of the rectifier system. The voltage-doubler action of the high-voltage rectifier system halves the voltage to be developed by the autotransformer and, therefore, halves the number of turns required in the winding 27*a*, lowers the effective capacitance of that winding, and halves the voltage stress in the insulation. Accordingly, that winding 27*a* has a smaller outer diameter than the corresponding winding 27 represented in Figs. 2 and 3 of the drawing, the insulating body 35*a* around the winding 27*a* can be made thinner, the window in the core can be made smaller, and the cross section of the winding 27*a* can be made wider and less deep. Furthermore, it may be unnecessary to use viscous insulating material except between the inner core leg 24*a* and the coil form 25*a***. In operation, the exciting current and the core loss will be slightly lowered because of the shorter magnetic circuit and the resistance loss will be greatly lowered because of the fewer turns in the winding.

*Description of Fig. 6 circuit*

Referring now to Fig. 6 of the drawing, there is represented a typical circuit diagram of a system for generating scanning currents in the line-scanning generator of a television receiver, which system includes an autotransformer **20*a* constructed in accordance with Figs. 4 and 5 of the drawing. A system of the type represented in Fig. 6 is fully described and claimed in applicant's Patent 2,646,532, granted July 21, 1953, and entitled "System for Generating a Periodic Scanning Current." The generating system comprises the usual amplifier stage including an electron-discharge device or tetrode 60 having a conventional control electrode-cathode input circuit to which a signal of generally trapezoidal wave form is applied by way of a pair of terminals 80, 80. The screen electrode of the tube 60 is connected to the grounded cathode through a condenser 61** and to a suitable source of operating potential +S*c* through a resistor 62. The load circuit of the tube 60 is essentially inductive and comprises the continuous winding of the autotransformer of Figs. 4 and 5 and a line-scanning winding 64 of the usual cathode-ray image-reproducing tube 90. The anode of the tube 60 is connected to the terminal **31*a* and the terminal 32*a* is coupled to ground through a storage condenser 65. The line-scanning winding 64 is coupled to the terminals 32*a* and 28*a*. The anode of a rectifier device such as a diode 67 is connected to a source +B and the cathode thereof is coupled to the terminal 30*a* through a direct-current path comprising an inductor 68 and is also coupled through an alternating-current path comprising a condenser 69 to the terminal 29*a*. The inductor 68 and the condenser 69 may be proportioned to serve as a linearity-correcting network for supplying a control effect to the line-scanning winding 64 to effect a correction for the effect of resistance in the line-scanning winding and part of the transformer winding and a correction for the flatness of the face of the cathode-ray image-reproducing tube. The generating system also includes a conventional voltage-doubler rectifier 70 which includes a pair of diode rectifiers 71 and 72, the anode of the former being directly connected to the terminal 33*a* of the autotransformer. The anode of the diode 72 is coupled to the anode of the diode 71 through a condenser 73 and is connected to the cathode thereof through a resistor 74. A storage condenser 78 is connected between the cathodes of the diodes 71 and 72 and a similar condenser 79 is connected between the cathode of the diode 71 and a unidirectional voltage output terminal 75 connected to the terminal 32*a*. A protective resistor 76 is connected to the cathode of the diode 72 for supplying the high rectified output voltage to an output terminal 77 adapted for connection to the anode terminal 91 of the cathode-ray tube 90 of a television receiver. Windings 36*a* and 86 supply current to the filaments of the diodes 71 and 72 and correspond to the loops 36*a* and 86 in Fig. 4. The core 21*a* is electrically connected by wire 83 to an intermediate terminal of transformer 20*a*, such as terminal 30*a***, to lower the maximum electrical stress between the core and the winding.

*Operation of Fig. 6 circuit*

The amplifier stage including the tube 60 functions as a class C amplifier and the driving potential applied to the control electrode of that tube is effective to cause it and the diode 67 to be rendered nonconductive during retrace intervals. During trace intervals, the currents flowing in the tubes 60 and 67 are effective to develop in the line-scanning winding 64 a substantially linearly rising portion of the saw-tooth current. The rapid retrace portion of the saw-tooth current developed in the winding 64 occurs when the tubes 60 and 67 are nonconductive. The diode 67 utilizes the magnetic energy stored in the essentially inductive load circuit of the tube 60 during trace intervals to develop across the condenser 65 a unidirectional voltage having a value which is substantially greater than that of the source +B. This potential may be supplied by the terminal 75 to a suitable utilizing circuits of the television receiver. The voltage-doubler rectifier circuit 70 utilizes the very high positive potential pulse developed at the terminal **33*a* to develop a high unidirectional potential for application to the terminal 77** for use by the anode circuit of the usual cathode-ray image-reproducing tube of a television receiver.

As explained in detail in the patent referred to above, the connection of inductor 68 to terminal **30*a* intermediate terminals 29*a* and 31*a* causes the direct-current magnetic bias of the transformer core to be much less than if the inductor were connected to the same terminal 29*a* as condenser 69**; and this permits fewer turns to be used in the transformer winding, with the result that the transformer can be made smaller and for a lower cost.

While applicant does not intend to limit the invention to any specific dimensions or sizes, the following are given as illustrative of one embodiment of the invention constructed in accordance with the arrangement of Figs. 4 and 5:

| | |
|---|---|
| Winding 27a | 700 turns of #34 single silk enamel wire with intermediate terminals at 200, 300, 380 and 460 turns. |
| Thickness | 9/32 inch. |
| Outer diameter | 1.10 inches. |
| Core | "Ferroxcube 3C" ferromagnetic material manufactured by the Ferroxcube Corporation of America, Saugerties, New York. |
| Length of shell (Fig. 4) | 1.96 inches. |
| Width of shell (Fig. 4) | 0.52 inch. |
| Thickness of outer core legs (Fig. 5) | 0.276 inch. |
| Thickness of core leg 24a | 0.49 inch. |
| Length of core leg 24a | 0.64 inch. |
| Coil form 25a | Bakelite cylinder 5/8 inch long, 0.025 inch thick, 11/16 inch outer diameter. |
| Body 35a | Polystyrene having 1 3/8 inch outer diameter, 5/8 inch thickness. |
| Smallest spacing of winding 27a from side of core 21a | 3/32 inch. |
| Viscous insulating material in clearance spaces | silicone. |

From the foregoing description, it will be seen that an autotransformer constructed in accordance with the present invention for use in the line-scanning system of a television receiver is simple in construction, easy to fabricate and assemble, and relatively inexpensive to manufacture. It will also be clear that a transformer of the type under consideration embodying the present invention is small in size, has a reduced tendency for corona to occur therein, is compact and light in weight, and is also capable of adequately dissipating the heat developed in the various windings thereof.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An autotransformer for a television receiver comprising: a core of magnetic material shaped to form a closed magnetic path; a single continuous multiple layer multipurpose winding of insulated wire of uniform gauge surrounding a portion of said core and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of the smaller dimension of said rectangular cross section and substantially occupying all the space between said winding and said core for preventing corona between the surfaces of said winding and said core.

2. An autotransformer for a television receiver comprising: a core of magnetic material shaped to form a closed magnetic path; a single continuous multiple layer multipurpose winding of insulated wire of uniform gauge surrounding a portion of said core and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth at least one-third the smaller dimension of said rectangular cross section and substantially occupying all the space between said winding and said core for preventing corona between the surfaces of said winding and said core.

3. An autotransformer for a television receiver comprising: a core of magnetic material shaped to form a closed magnetic path; a single continuous multiple layer multipurpose winding of insulated wire of uniform gauge surrounding a portion of said core and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth within the range of one-half to one times the smaller dimension of said rectangular cross section and substantially occupying all the space between said winding and said core for preventing corona between the surfaces of said winding and said core.

4. An autotransformer for a television receiver comprising: a core of magnetic material shaped to form a closed magnetic path; a single continuous multiple layer multipurpose winding of insulated wire of uniform gauge surrounding a portion of said core and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; a body of solid insulating material completely surrounding said winding to a depth of the order of the smaller dimension of said rectangular cross section and substantially occupying all the space between said winding and said core; and viscous insulating material in the remainder of said space between said body and said core where corona would otherwise occur and coacting with said body to prevent corona between the surfaces of said winding and said core.

5. An autotransformer for a television receiver comprising: a core of magnetic material shaped to form a closed magnetic path; a single continuous multiple layer multipurpose winding of insulated wire of uniform gauge surrounding a portion of said core and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of the smaller dimension of said rectangular cross section and substantially occupying all the space between said winding and said core; and viscous insulating material in the inner portion of the remainder of said space between said body and said core coacting with said body to prevent corona between the surfaces of said winding and said core.

6. An autotransformer for a television receiver comprising: a core of magnetic material shaped to form a pair of closed magnetic paths and including a core leg common to said paths; a single continuous multiple layer multipurpose winding of insulated wire of uniform gauge surrounding said core leg and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of the smaller dimension of said rectangular cross section and substantially occupying all the space between said winding and said core for preventing corona between the surfaces of said winding and said core.

7. An autotransformer for a television receiver comprising: a core of magnetic material shaped to form a pair of closed magnetic paths and including a core leg of approximately circular cross section common to said paths; a single continuous multiple-layer multipurpose circular winding of insulated wire of uniform gauge surrounding said core leg and having a rectangular axial plane cross section of a continuous regular configuration and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of the smaller dimension of said rectangular cross section and substantially occupying all the space between said winding and said core for preventing corona between the surfaces of said winding and said core.

8. An autotransformer for a television receiver comprising: a core of magnetic material including an E-shaped portion and a portion forming therewith a pair of closed magnetic paths with an inner core leg common to said paths; a single continuous multiple layer multipurpose winding of insulated wire of uniform gauge surrounding said inner core leg and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of the smaller dimension of said axial cross section and substantially occupying all the space between said winding and said core for preventing corona between the surfaces of said winding and said core.

9. An autotransformer for a television receiver comprising: a core of magnetic material including a pair of E-shaped portions with the free ends thereof in abutting relationship to form a pair of closed magnetic paths with an inner core leg common to said paths; a single continuous multiple layer multipurpose winding of insulated wire of uniform gauge surrounding said inner core leg and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of the smaller dimension of said rectangular cross section and substantially occupying all the space between said winding and said core for preventing corona between the surfaces of said winding and said core.

10. An autotransformer for a television receiver comprising: a core of magnetic material shaped to form a closed magnetic path; a single continuous multiple layer multipurpose winding of insulated wire of uniform gauge surrounding a portion of said core and having a rectangular axial plane cross section, an axial dimension small with relation to the outer diameter thereof, and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of said axial dimension and substantially occupying all the space between said winding and said core for preventing corona between the surfaces of said winding and said core.

11. An autotransformer for a television receiver comprising: a core of magnetic material shaped to form a closed magnetic path; a single continuous multiple layer multipurpose winding of insulated wire of uniform gauge surrounding a portion of said core and having a rectangular axial plane cross section, an axial dimension small with relation to the outer diameter thereof, and having a plurality of intermediate electrical connections defining a plurality of winding portions, spaced ones of said winding portions being adapted during operation safely to conduct currents of greater magnitude than the winding portions intermediate said spaced portions because of heat transfer therefrom to said intermediate portions, whereby said wire diameter may be small and the heat dissipated by said spaced portions with relation to said wire diameter may be large, one of said spaced portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of said axial dimension of said rectangular cross section and substantially occupying all the space between said winding and said core for preventing corona between the surfaces of said winding and said core.

12. An autotransformer for a television receiver comprising: a core of magnetic material shaped to form a closed magnetic path; a single coil form of insulating material disposed about a portion of said core; a single continuous multiple layer multipurpose winding of insulated wire of uniform gauge surrounding said form and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding the portions of said winding unsupported by said coil form to a depth of the order of the smaller dimension of said rectangular cross section and substantially occupying all the space between said winding and said core for preventing corona between the surfaces of said winding and said core.

13. An autotransformer for a television receiver comprising: a core of magnetic material shaped to form a pair of closed magnetic paths and including a core leg common to said paths; a single continuous multiple layer multipurpose winding of insulated wire of uniform gauge surrounding said core leg and having a rectangular axial plane cross section and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; a body of solid insulating material completely surrounding said winding to a depth of the order of the smaller dimension of said rectangular cross section and substantially occupying all the space between said winding and said core for preventing corona between the surfaces of said winding and said core; and a wire loop supporting in said body and looped about one of said magnetic paths of said core.

14. An autotransformer for a television receiver comprising: a core of magnetic material shaped to form a closed magnetic path; a single continuous multiple layer multipurpose winding of insulated wire of uniform gauge surrounding a portion of said core and having an axial plane cross section of a continuous regular configuration and having a plurality of intermediate electrical connections defining a plurality of winding portions, one of said portions being adapted to be connected to the line-scanning winding of the cathode-ray tube of the receiver for supplying a scanning wave thereto and the entire winding being adapted to be connected through a rectifier between the anode and the cathode of that tube for supplying high voltage therebetween; and a body of solid insulating material completely surrounding said winding to a depth of the order of the smallest dimension of said cross section and substantially occupying all the space between said winding and said core for preventing corona between the surfaces of said winding and said core.

References Cited in the file of this patent

UNITED STATES PATENTS

| | | |
|---|---|---|
| 2,158,613 | Loughlin | May 16, 1939 |
| 2,311,450 | Marsh | Feb. 16, 1943 |
| 2,436,188 | Bilodeau | Feb. 17, 1948 |
| 2,456,219 | Shaheen | Dec. 14, 1948 |
| 2,464,029 | Ehrman | Mar. 8, 1949 |
| 2,500,766 | Obert et al. | Mar. 14, 1950 |
| 2,550,501 | Sims | Apr. 24, 1951 |
| 2,579,288 | Allison et al. | Dec. 18, 1951 |
| 2,678,413 | Adler et al. | May 11, 1954 |